(12) United States Patent
Skrabelj et al.

(10) Patent No.: US 9,025,625 B2
(45) Date of Patent: May 5, 2015

(54) METHOD FOR OPERATING A LASER SYSTEM

(71) Applicant: Fotona d.d., Ljubljana (SI)

(72) Inventors: Dejan Skrabelj, Lesce (SI); Marko Marincek, Ljubljana (SI)

(73) Assignee: Fotona d.d., Ljubljana (SI)

( * ) Notice: Subject to any disclaimer, the term of this patent is extended or adjusted under 35 U.S.C. 154(b) by 2 days.

(21) Appl. No.: 14/266,847

(22) Filed: May 1, 2014

(65) Prior Publication Data

US 2014/0376574 A1 Dec. 25, 2014

(30) Foreign Application Priority Data

May 3, 2013 (EP) .................................... 13002365

(51) Int. Cl.
| | | |
|---|---|---|
| *H01S 3/11* | (2006.01) | |
| *H01S 3/115* | (2006.01) | |
| *H01S 3/107* | (2006.01) | |
| *H01S 3/092* | (2006.01) | |
| *H01S 3/16* | (2006.01) | |
| *H01S 3/00* | (2006.01) | |

(52) U.S. Cl.
CPC .................. *H01S 3/115* (2013.01); *H01S 3/092* (2013.01); *H01S 3/107* (2013.01); *H01S 3/1611* (2013.01); *H01S 3/0092* (2013.01); *H01S 3/1643* (2013.01)

(58) Field of Classification Search
CPC ....... H01S 3/00; H01S 3/0085; H01S 3/0092; H01S 3/10; H01S 3/109; H01S 3/1095; H01S 3/11; H01S 3/115
USPC .................... 372/10, 21–22, 25–26
See application file for complete search history.

(56) References Cited

U.S. PATENT DOCUMENTS

| | | | |
|---|---|---|---|
| 4,221,463 A | 9/1980 | Barsack et al. | |
| 5,221,988 A | 6/1993 | Juhasz | |

(Continued)

FOREIGN PATENT DOCUMENTS

| | | |
|---|---|---|
| EP | 0 383 638 A2 | 8/1990 |
| GB | 2 135 471 A | 8/1984 |
| JP | 2005 268415 A | 9/2005 |

OTHER PUBLICATIONS

Salvestrini J. P. et al.: Comparative study of nonlinear optical crystals for electro-optic Q-switching of laser resonators; Optical Materials, Elsevier Science Publishers B.V.., The Netherlands (Sep. 1, 2004), pp. 449-458.

*Primary Examiner* — Dung Nguyen
(74) *Attorney, Agent, or Firm* — Gudrun E. Huckett

(57) ABSTRACT

In a method for operating a laser system in a Q-switched mode, the laser system provided with a laser resonator with a laser medium and an electro-optical modulator, wherein the electro-optical modulator has an EOM crystal, wherein the EOM crystal has a characteristic ringing time ($t_0$) when subjected to acoustic ringing, the EOM crystal is driven by modulator voltage pulses ($p_m$) having a modulator voltage pulse duration ($t_{ml}$). A train of at least two subsequent laser pulses ($p_l$) is generated. The modulator voltage pulse duration ($t_{ml}$) is selected to be at least approximately equal to the characteristic ringing time ($t_0$) of the EOM crystal multiplied by an integer factor.

5 Claims, 3 Drawing Sheets

(56) References Cited

U.S. PATENT DOCUMENTS

| | | |
|---|---|---|
| 7,324,266 B2 | 1/2008 | Fehn et al. |
| 2004/0146075 A1* | 7/2004 | Kennedy et al. ............... 372/10 |
| 2008/0018977 A1* | 1/2008 | Bergmann et al. ............ 359/257 |
| 2011/0310922 A1* | 12/2011 | Ko et al. ......................... 372/99 |

* cited by examiner

METHOD FOR OPERATING A LASER SYSTEM

BACKGROUND OF THE INVENTION

The present invention relates to a method for operating a laser system in a Q-switched mode, thereby generating a train of at least two subsequent laser pulses, wherein said laser system has a laser resonator with a laser medium and an electro-optical modulator, wherein the electro-optical modulator comprises an EOM crystal, wherein the EOM crystal has, when subjected to acoustic ringing, a characteristic ringing time, and wherein the EOM crystal is driven by modulator voltage pulses having a modulator voltage pulse duration, For numerous applications laser systems are required to generate a train of subsequent laser pulses. The laser system comprises a laser medium, e.g. a laser crystal, which is pumped by a flashlamp in order to generate such laser pulses. In the common free running operation mode the laser pulses follow the flashlamp pulses with some time delay, thereby approximately resembling the flashlamp pulses to some extent in form and frequency. However, the free running operation mode is limited with respect to high peak powers and very short pulse durations.

In order to achieve high peak powers and/or shorter pulse durations, the laser systems further comprises an electro-optical modulator (EOM), e.g. a Pockels cell, which enables a laser resonator to operate in a quality switched (Q-switched) mode. In combination with a polarizer and optionally a quarter wave plate it serves as an optical switch to enable generation of short and high power laser pulses having peak powers some orders of magnitude higher compared to a common free running mode of operation.

The electro-optical modulator (EOM) typically comprises a Pockels cell. The basic element of a Pockels cell is an optical crystal (EOM crystal as referred to herein), which exhibits birefringence when an electric field is applied. This influences polarization of a laser beam in a resonator and by applying a well defined voltage pulse the optical switch can be driven from a closed to an open state. If transition from a closed to an open state is made fast and energy is already accumulated in the laser medium, this results in an intense build-up of a Q-switched laser pulse.

Application of the modulator voltage pulse on the EOM crystal, however, not only changes the optical properties of the crystal, but also causes the crystal to change its mechanical properties due to the piezoelectric effect. When voltage is applied quickly (in a step function) the EOM crystal starts to oscillate, changing its longitudinal dimensions. This phenomenon is usually referred to as acoustic ringing and results in oscillations of the optical switch properties around the stationary value with characteristic ringing time or ringing period, which dies out with a characteristic damping time. The characteristic damping time is usually orders of magnitude higher compared to the characteristic ringing time.

During the ringing period the switching properties of the optical switch (EOM) are not stable and no proper control of the laser cavity losses is possible. If a second Q-switched pulse is to be generated when the ringing effect is still present, this influences the second pulse stability to a great extent. Additionally, during the pumping sequence of the second pulse pre-lasing action can occur because of the oscillating behaviour of the Q-switch. This effect can therefore limit the operation of Q-switched lasers when the repetition rates, i.e. modulator pulse periods shorter than the characteristic damping time are desired.

Different crystals can be used in the EOM exhibiting more or less pronounced piezoelectric effect (KD*P, BBO, lithium niobate, . . . ). Generally, more pronounced birefringence effect is associated with more prominent piezoelectric effect. In consequence the achievable repetition rate of Q-switched laser pulses is significantly limited by said piezoelectric effect and the resultant acoustic ringing.

Methods that suppress acoustic ringing and therefore extend the repetition rate limit of the Q-switching have been extensively studied in the past. U.S. Pat. No. 4,221,463 proposes to filter the ringing oscillations by the combination of a second EO crystal and a polarizer. Appropriate voltage is applied to the second crystal at the trailing edge of the laser pulse to filter the ringing out of the laser cavity. According to U.S. Pat. No. 5,221,988 a pair of dielectric panes are attached to opposite sides of the EO crystal. The panes are in contact with aluminum blocks, which mechanically dampen the ringing oscillations. Another way of mechanically reducing the ringing oscillation effect is described in U.S. Pat. No. 7,324,266.

The invention has the object to avoid ringing oscillations of the EOM crystal in a Q-switched mode operation of a laser system when generating a train of at least two subsequent laser pulses.

SUMMARY OF THE INVENTION

This object is solved by a method characterized in that the modulator voltage pulse duration is at least approximately equal to the characteristic ringing time multiplied by an integer factor.

According to the invention a method for operating a laser system in a Q-switched mode, thereby generating a train of at least two subsequent laser pulses is proposed. The laser system has a laser resonator with a laser medium and an electro-optical modulator. The electro-optical modulator comprises an EOM crystal. The EOM crystal has, when subjected to acoustic ringing, a characteristic ringing time and a characteristic damping time. The EOM crystal is driven by modulator voltage pulses having a modulator voltage pulse duration. The modulator voltage pulse duration is at least approximately equal to the characteristic ringing time multiplied by an integer factor.

By means of the inventive method, ringing of an EOM is significantly suppressed only by applying modulator voltage pulses of a specific timing sequence. The switching or modulator voltage pulse duration has to be equal to the Pockels cell ringing period or integer multiples thereof. This can be explained by the fact that an acoustic wave generated by the initial (positive) pulse slope can be annihilated by an acoustic wave generated by the final (negative) pulse slope if the "on" and "off" times are one or more characteristic ringing time(s) apart.

Preferably, the modulator voltage pulses are at least approximately square shaped. In this case, both along with the "on" and the "off" slopes, a pronounced ringing excitation is generated respectively to roughly the same amplitudes having the same absolute values but opposite signs. This allows for an at least approximately complete ire extinction of subsequent acoustic ringing waves.

Advantageously, the integer factor for multiplying the characteristic ringing time to obtain the drive modulator pulse duration is 1 (one). Thereby, the efficiency of ringing annihilation is maximized, since the ringing wave, which is inversely excited by the final pulse slope, meets the ringing wave excited by the initial pulse slope at a time, where no or not much dampening has taken place. Both excited waves meet each other with amplitudes having at least approximately the same absolute values, but opposite signs. This again allows for an at least approximately complete extinction of subsequent acoustic ringing waves.

In a preferred alternative, the integer factor for multiplying the characteristic ringing time to obtain the drive modulator pulse duration is greater than 1 (one). An initial slope of a single modulator voltage pulse excites ringing of the EOM crystal at amplitudes with an initial amplitude at a starting time and a dampened limit amplitude at a limit time, wherein said limit amplitude has an absolute value being at least approximately 80% of the initial amplitude's absolute value. Said integer factor is limited such that the modulator voltage pulse duration of a single modulator voltage pulse is ≤the limit time. Although in this case the ringing wave, which is inversely excited by the final pulse slope, meets the ringing wave excited by the initial pulse slope at a time when some dampening has already taken place, both excited waves meet each other with opposite amplitudes having not too much difference in their absolute value, i.e. with a difference of ≤20%. This limited difference of both meeting amplitudes is sufficiently low to still provide a sufficiently high extinction. In addition, the drive modulator pulse duration is not limited to one specific value as would be prescribed by an integer factor of 1, but may be varied to longer durations according to the needs of the actual task to be performed.

Preferably, the laser pulses are frequency doubled. This is the case, wherein in the past ringing was most troublesome, and wherein the inventive method achieves the most benefit.

BRIEF DESCRIPTION OF THE DRAWINGS

An example of the inventive method will be explained in the following in more detail referring to the drawings.

DESCRIPTION OF PREFERRED EMBDOIMENTS

Figure 1:
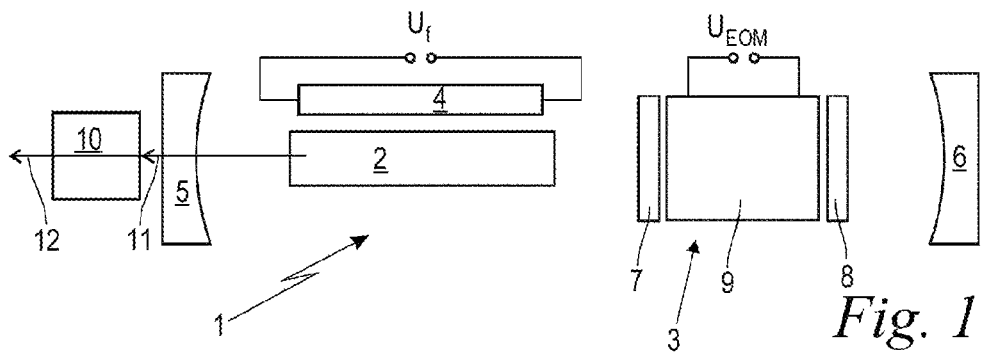
FIG. 1 shows a schematic illustration of laser cavity with an electro-optical modulator to perform Q-switching thereby generating a train of at least two subsequent laser pulses.

FIG. 1 shows in a schematic illustration a laser resonator 1 of a laser system adapted to generate a train of at least two or more subsequent laser pulses $p_l$ (FIG. 5, 6) in a quality switched (Q-switched) mode, thereby being operated according to the inventive method. The laser cavity comprises a laser medium 2 being disposed between mirrors 5, 6 facing each other. In the shown preferred example, the laser medium 2 is a solid state laser crystal, here an Nd:YAG crystal generating a typical wavelength of 1.064 nm. However, the laser medium 2 may be of any other type including gas or liquid medium suitable for operation in a Q-switched mode. Adjacent to the laser medium 2 an excitation source 4 is disposed. The excitation source 4 in the shown preferred embodiment is a flashlamp generating excitation light pulses upon a flashlamp voltage $U_f$ being applied thereto. However, the excitation source 4 may be a laser diode or any other suitable means as well.

When the laser medium 2 is subjected to an excitation light impulse of the excitation source 4, optical laser energy is generated in the laser medium 2 between the two mirrors 5, 6 and passes through the output side mirror 5 as an initial laser beam 11 that is guided to the target (not shown), as is well known in the art. The generation of optical laser energy in a free running mode lasts approximately as long as the excitation light impulse.

In order to generate a train of short, high energy laser pulses $p_l$ (FIG. 5, 6), the laser resonator 1 further comprises an electro-optical modulator 3 acting as a quality switch, which is disposed in the shown embodiment between the laser medium 2 and one of the two mirrors 5, 6. However, the electro-optical modulator 3 can be disposed anywhere within the laser resonator 1. In the shown preferred embodiment, the electro-optical modulator 3 comprises a polarizer 7, an optional λ/4 waveplate 8 and a Pockels cell, wherein the Pockels cell is disposed between the polarizer 7 and the optional λ/4 waveplate 8. The Pockels cell comprises a birefringence EOM crystal 9 to which an EOM voltage $U_{EOM}$ can be applied. However, any other suitable type of an electro-optical modulator 3 having an EOM crystal 9 may be used. By means of the applied EOM voltage $U_{EOM}$ the electro-optical modulator 3 can be switched between an open, transmissive and a closed, non-transmissive state. In the experiments shown in FIGS. 3, 5, 6, and 7, the "on Q-switching" scheme is used, wherein the Q-switch is closed when no EOM voltage $U_{EOM}$ is applied to the electro-optical modulator 3. However, an "off Q-switching" scheme with an inverse voltage supply may be used in the alternative.

Figure 5:
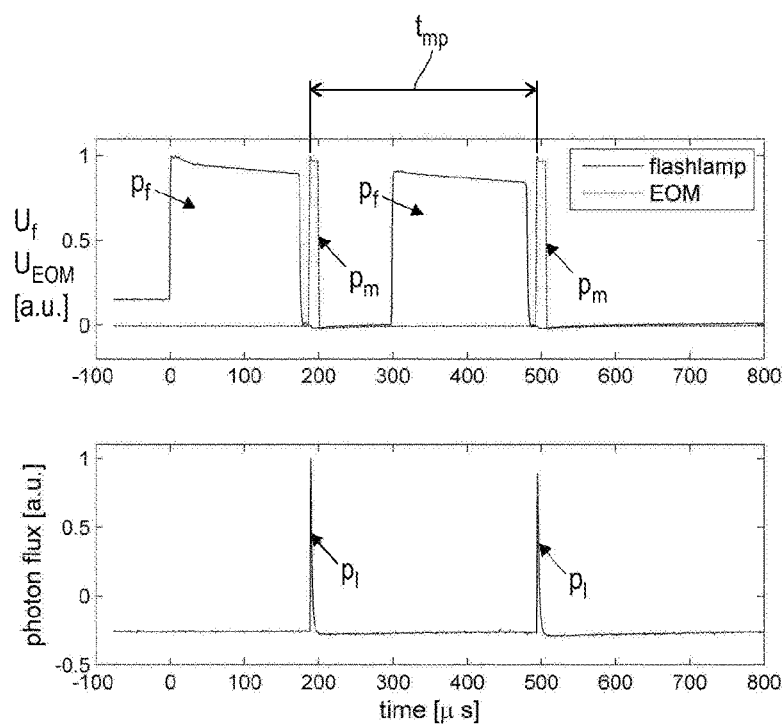
FIG. 5 is a diagram presenting a sequence of two EOM modulator voltage pulses and two laser output pulses according to the invention with a pronounced second laser output pulse that is undisturbed by EOM ringing.

In the closed state of the electro-optical modulator 3, the generated optical laser energy is prevented from passing through the output side mirror 5 and accumulates to an increasing energy level during light excitation from the excitation source 4. When the electro-optical modulator 3 is switched from the closed state to the open state, the accumulated optical laser energy passes through and emerges from the laser resonator 1 as a short, high energy laser pulse $p_l$ (FIG. 5, 6). Said initial laser beam 11 is comprised of a train of such laser pulses $p_l$.

At the external side of the output side mirror 5, an optional frequency doubler 10 may be disposed, as shown in the preferred embodiment of FIG. 1. The frequency doubler 10 comprises a non-linear crystal (such as KTP, BBO . . . ), wherein the passing initial laser beam 11 having an initial frequency is converted to a frequency doubled laser beam 12 comprised of said train of laser pulses $p_l$ having a double frequency compared to the initial frequency.

Figure 2:
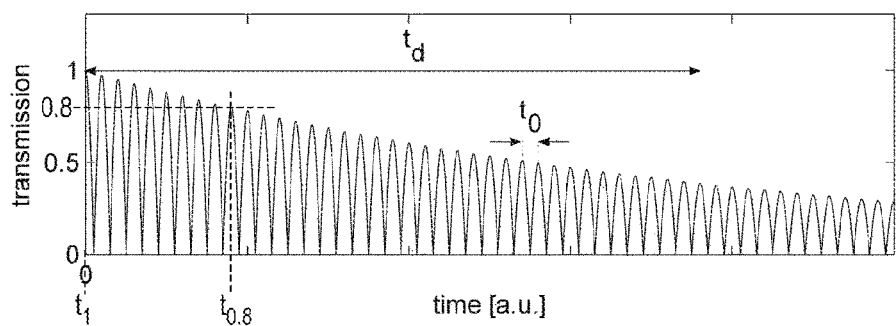
FIG. 2 is a diagram presenting ringing of the electro-optical modulator without counter measures.

Due to a piezoelectric effect, switching of the electro-optical modulator 3 between either one of the closed state and open state causes the EOM crystal 9 to oscillate, changing its longitudinal dimensions. This phenomenon is usually referred to as acoustic ringing and is presented in the diagram of FIG. 2 by showing the electro-optical modulator 3 transmission over time in a schematic, non-experimental graph. The acoustic ringing of the EOM crystal 9 results in oscillations of the optical transmission properties of the entire electro-optical modulator 3 around the stationary value with a characteristic ringing time $t_0$, i.e. the time between two subsequent oscillation peaks; it dies out with a characteristic damping time $t_d$. The characteristic damping time $t_d$ is usually much higher in comparison to the characteristic ringing time $t_0$.

Figure 3:
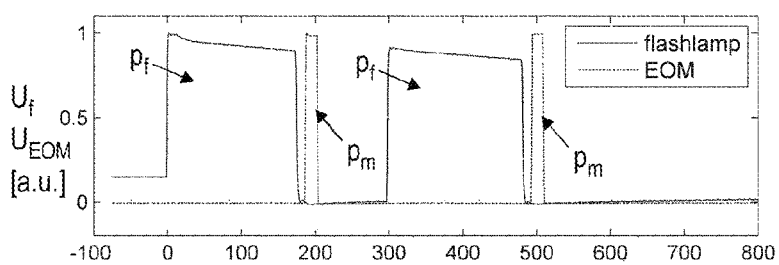
FIG. 3 is a diagram presenting a sequence of two EOM modulator voltage pulses and subsequent laser output pulses according to the prior art with the subsequent laser output pulses being disturbed by unsuppressed EOM ringing.
Figure 3:
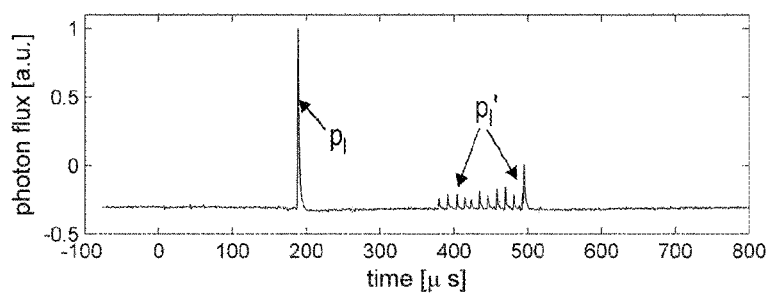

FIG. 3 and FIG. 5 each show a diagram presenting an experimental sequence of two EOM modulator voltage pulses $p_m$ and the resultant Q-switched output laser pulses $p_l$ generated by the laser system according to FIG. 1. The ringing properties of the EOM crystal 9 of the electro-optical modulator 3 were determined to have a characteristic ringing time $t_0$ of 11.6 µs.

Two consecutive Q-switched sequences are generated. In each Q-switched sequence, the laser medium 2 is pumped for excitation with an approximately 180 µs long flashlamp pulse $p_f$. Shortly after the excitation of the laser medium 2, a square modulator voltage pulse $p_m$ is applied to the electro-optical modulator 3 and the stored optical laser energy, at least in the first Q-switched sequence, is released as a laser pulse $p_l$. In both cases of FIGS. 3 and 5 the two consecutive Q-switched sequences are triggered with a modulator pulse period $t_{mp}$ of approximately 300 µs.

Referring now to FIG. 3 in combination with FIG. 1, said pulse sequence is shown in accordance with the prior art without providing a specific timing of the modulator voltage pulse $p_m$ in relation to the characteristic ringing time $t_0$. A modulator voltage pulse duration $t_{ml}$ of 15.9 µs is applied, which is no integer multiple of and different from the 11.6 µs characteristic ringing time $t_0$. The driving modulator voltage pulse $p_m$ initiates ringing that causes the resonator losses to oscillate around the Q-switch "close" state, which initiates laser action already during the second, subsequent pumping interval. Before applying the second driving modulator voltage pulse $p_m$ to the EOM crystal 9 the stored optical laser energy of the second pumping interval is emitted in a train of unwanted parasitic laser pulses $p_l'$. The period of the parasitic pulses $p_l'$ corresponds to the characteristic ringing time $t_0$, which here is on average equal to 11.6 µs. The unwanted emission of FIG. 3 greatly reduces the energy that otherwise could be released in a second Q-switched pulse $p_l$, as shown in FIG. 5.

Figure 4:
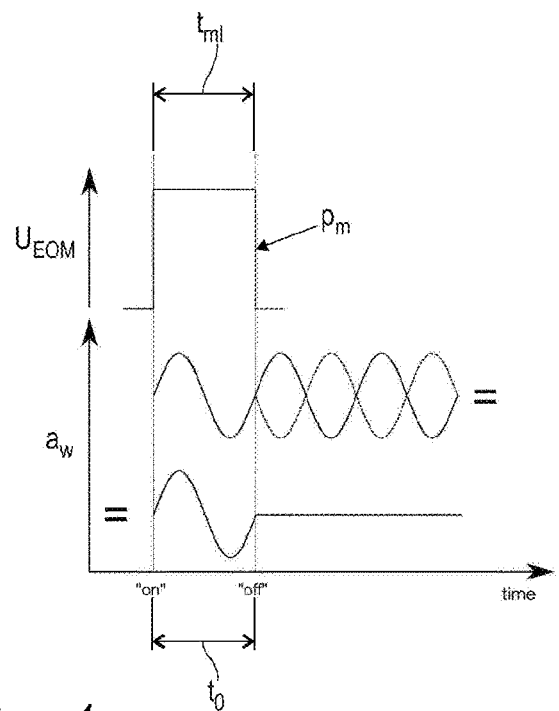
FIG. 4 is a diagram presenting annihilation of acoustic ringing waves generated by the inventive EOM modulator voltage pulse timing.

FIG. 4 shows a diagram presenting the inventive annihilation of acoustic ringing waves generated by the inventive EOM modulator voltage pulse timing. The course of the applied EOM voltage $U_{EOM}$ over time is shown in its interaction with the course of acoustic wave amplitudes $a_w$ of the EOM crystal 9. One single of multiple modulator voltage pulses $p_m$ is shown with an initial slope, with a final slope and with the modulator voltage pulse duration $t_{ml}$ in between. The modulator voltage pulses $p_m$, i.e. the course of their EOM voltage $U_{EOM}$ over time, are preferably at least approximately square shaped. In other words, both the initial and the final slope preferably are at least approximately vertical when depicted in a diagram over time. According to the inventive method, a modulator voltage pulse $p_m$ with a modulator voltage pulse duration $t_{ml}$ is applied, which is at least approximately equal to the characteristic ringing time $t_0$ multiplied by an integer factor. The integer factor according to FIG. 4 is chosen as 1 (one) and, consequently, the voltage pulse duration $t_{ml}$ is at least approximately equal to the characteristic ringing time $t_0$. However, other suitable integer factors like 2, 3, 4 and so forth may be chosen as well, as shown and described in the context of FIG. 7. "Approximately equal" means in the present context that the voltage pulse duration $t_{ml}$ meets the mathematical product of the characteristic ringing time $t_0$ and the chosen integer factor with a tolerance of no more than ±25%, preferably of no more than ±15%, and even more preferred of no more than ±5% of the characteristic ringing time $t_0$.

The initial slope or ramp of the shown modulator voltage pulse $p_m$ induces the aforementioned ringing oscillation of the electro-optical modulator 3 with said acoustic wave amplitudes $a_w$, starting in a certain, here positive, direction, as shown in FIG. 4 with a solid line. The final slope or ramp of the modulator voltage pulse $p_m$ induces a further ringing oscillation starting in the opposite, here negative, direction, since the final slope has the opposite sign compared to the initial slope. This is shown in FIG. 4 with a dashed line. Due to the inventive modulator voltage pulse duration $t_{ml}$ both ringing excitations are spaced apart by one or more integer multiples of the characteristic ringing time $t_0$. In combination with the aforementioned opposite starting directions this leads to the effect that an acoustic wave generated by the positive pulse slope is at least approximately annihilated, respectively, extinguished by an acoustic wave generated by the negative pulse slope, if the "on" and "off" times are one characteristic ringing time $t_0$ (or integer multiples thereof) apart.

As already mentioned above, the integer factor for multiplying the characteristic ringing time $t_0$ to obtain the drive modulator pulse duration $t_{ml}$ may be >1 (one). However, according to the inventive findings, the maximum desirable integer factor should preferably be limited to a certain extent. From the combination of FIGS. 2, 4 it follows, that the initial slope of a single modulator voltage pulse $p_m$ excites ringing of the EOM crystal 9 at an amplitude $a_w$ with an initial amplitude (normalized transmission amplitude=1.0 in FIG. 2) at a starting time $t_1$, which is subsequently dampened to a limit amplitude after a limit time $t_{0.8}$. Said limit amplitude has an absolute value that is at least approximately 80%, i.e. as close as possible to 80%, of the initial amplitude's absolute value (normalized transmission amplitude=0.8 in FIG. 2). Said integer factor is preferably limited such that the modulator voltage pulse duration $t_{ml}$ of a single modulator voltage pulse $p_m$ is ≤ the limit time $t_{0.8}$. Referring to FIG. 4, this means that the first solid line acoustic wave amplitude $a_w$, as induced by the initial slope or ramp of the modulator voltage pulse $p_m$, is dampened by no more than 20%, with more than 80% of its initial absolute value remaining, before it meets the first inverse acoustic wave amplitude $a_w$ of the dashed line ringing oscillation as induced by the final slope or ramp of the modulator voltage pulse $p_m$. This first inverse acoustic wave amplitude $a_w$ is still at 100%, since no dampening has taken place yet. Although an interference of a 80% (or more) wave with a 100% inverse wave does not provide a 100% extinction, the achieved extinction effect is sufficiently high for a desirable normalized conversion efficiency, as discussed below in connection with FIG. 7.

FIG. 5 shows the diagram according to FIG. 3, however, with application of a different and inventive modulator voltage pulse duration $t_{ml}$ according to FIG. 4. When the width of the modulator voltage pulse duration $t_{ml}$ approaches the characteristic ringing time $t_0$ (or integer multiples thereof), the unwanted parasitic spikes of FIG. 3 are more and more suppressed. Within the aforementioned tolerances, the parasitic spikes are sufficiently suppressed and, consequently, a pronounced second, subsequent laser pulse $p_l$ is formed. The stored energy is thus efficiently released in the second Q-switched laser pulse $p_l$. The situation of complete suppression of parasitic spikes is shown in FIG. 5. The complete suppression of parasitic spikes in a crystal is achieved when the voltage pulse duration $t_{ml}$ is set sufficiently close to the characteristic ringing time $t_0$ (or integer multiples thereof), which is here e.g. 11.6 μs.

Figure 6:
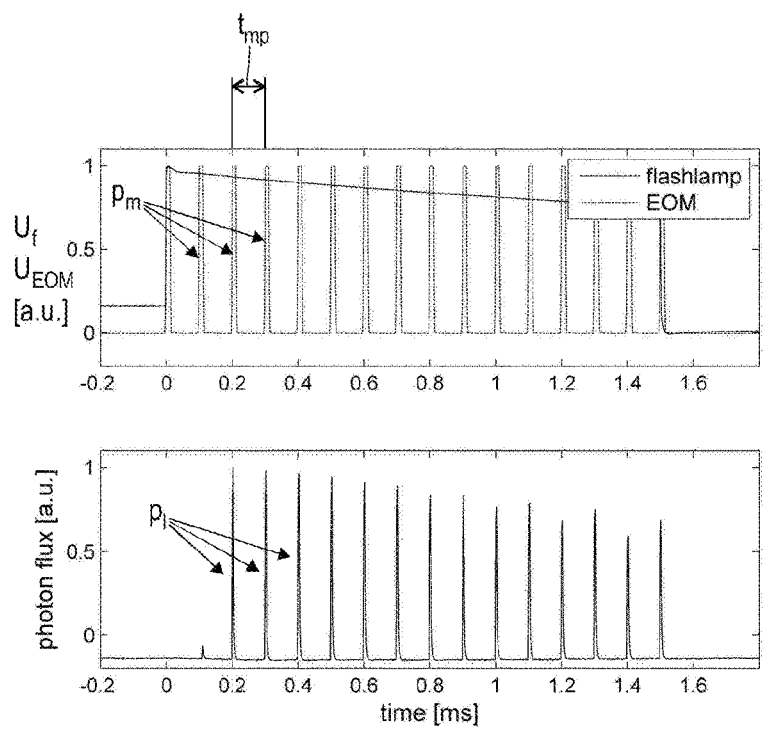
FIG. 6 is a diagram presenting a sequence of multiple EOM modulator voltage pulses and multiple pure Q-switched laser output pulses according to the invention.

The inventive case as studied in connection with FIGS. 4 and 5 can be further generalized to a sequence of more than two subsequent Q-switched laser pulses $p_l$. If the modulator voltage pulse duration $t_{ml}$ equals multiple integer of the characteristic ringing time $t_0$, then a sequence of "pure" Q-switched laser pulses $p_l$ is obtained without any unwanted parasitic laser action even well below the damping time of the piezoacoustic ringing, as shown in FIG. 6.

Figure 7:
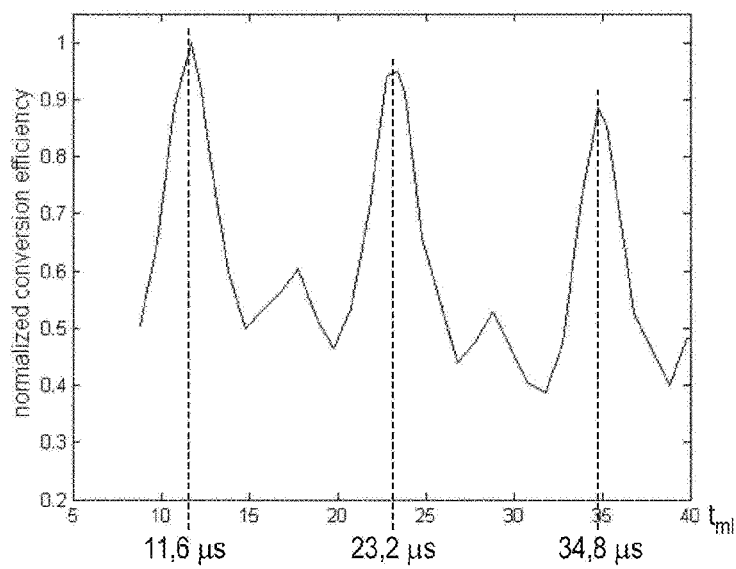
FIG. 7 is a diagram presenting the normalized conversion efficiency of frequency doubling with efficiency peaks close to integer factors of the characteristic ringing time.

FIG. 7 shows a diagram presenting the normalized conversion efficiency of frequency doubled laser pulses $p_l$ with efficiency peaks close to integer multiples of the characteristic ringing time $t_0$. Ringing suppression is particularly important when Q-switched output laser pulses $p_l$ are frequency doubled by a non-linear crystal (such as KTP, BBO . . . ), as shown in FIG. 1. The conversion efficiency in the doubling process is proportional to the square of the incident pulse peak power, and therefore any unwanted parasitic emission, which decreases the energy of Q-switched laser pulses $p_l$, greatly reduces the conversion efficiency. In the present preferred example a frequency doubling of the Nd:YAG 1.064 nm light is performed and a laser wavelength of 532 nm is obtained. The train of laser pulses $p_l$ shown in FIG. 6 was passed through the KTP crystal. The energy of the 1.064 nm light was kept constant, and the modulator voltage pulse duration $t_{ml}$ on the Pockets cell was varied, while its amplitude remained constant, as shown in FIG. 7. The normalized conversion efficiency has peaks at modulator voltage pulse durations $t_{ml}$ that equal multiple integer of the characteristic ringing time $t_0$, from which integers of 1, 2 and 3 are shown, corresponding to modulator voltage pulse durations $t_{ml}$ of 11.6 μs (integer factor=1), 23.2 μs (integer factor=2) and 34.8 μs (integer factor=3). When the parasitic oscillations become pronounced between the peaks, the normalized conversion efficiency drops by approximately 50%. On the other hand, at said peaks generated by the inventive method, the normalized conversion efficiency is sufficiently close to 100%, as long as the chosen integer factor for multiplying the characteristic ringing time $t_0$ to obtain the drive modulator pulse duration $t_{ml}$ is within the aforementioned limits.

The specification incorporates by reference the entire disclosure of European priority document 13 002 365.8 having a filing date of May 3, 2013.

While specific embodiments of the invention have been shown and described in detail to illustrate the inventive principles, it will be understood that the invention may be embodied otherwise without departing from such principles.

What is claimed is:

1. A method for operating a laser system in a Q-switched mode, the laser system comprising a laser resonator with a laser medium and an electro-optical modulator, wherein the electro-optical modulator comprises an EOM crystal, wherein the EOM crystal has a characteristic ringing time ($t_0$) when subjected to acoustic ringing, the method comprising:
   driving the EOM crystal by modulator voltage pulses ($p_m$) having a modulator voltage pulse duration ($t_{ml}$);
   generating a train of at least two subsequent laser pulses ($p_l$);
   selecting the modulator voltage pulse duration ($t_{ml}$) to be equal to the mathematical product of the characteristic ringing time ($t_0$) of the EOM crystal and of an integer factor with a tolerance of no more than ±25% of the characteristic ringing time ($t_0$).

2. The method according to claim 1, wherein the modulator voltage pulses ($p_m$) are at least approximately square shaped.

3. The method according to claim 1, selecting the integer factor for multiplying the characteristic ringing time ($t_0$) of the EOM crystal to be 1.

4. The method according to claim 1, wherein an initial slope of a single modulator voltage pulse ($p_m$) excites ringing of the EOM crystal at amplitudes ($a_w$), including an initial amplitude at a starting time ($t_1$) and a dampened limit amplitude at a limit time ($t_{0.8}$); the method further comprising:
   selecting the limit time ($t_{0.8}$) such that the limit amplitude has an absolute value that is at least approximately 80% of an absolute value of the initial amplitude;
   selecting the integer factor for multiplying the characteristic ringing time ($t_0$) of the EOM crystal to be >1 and limiting the integer factor such that the modulator voltage pulse duration ($t_{ml}$) of the single modulator voltage pulse ($p_m$) is ≤the limit time ($t_{0.8}$).

5. The method according to claim 1, wherein the laser pulses ($p_l$) are frequency doubled.

* * * * *